R. C. & H. M. ELDRIDGE.
ANIMAL TRAP.
APPLICATION FILED OCT. 27, 1909.
1,026,305.
Patented May 14, 1912.
2 SHEETS—SHEET 2.
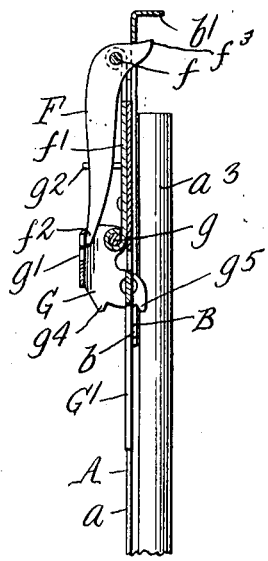
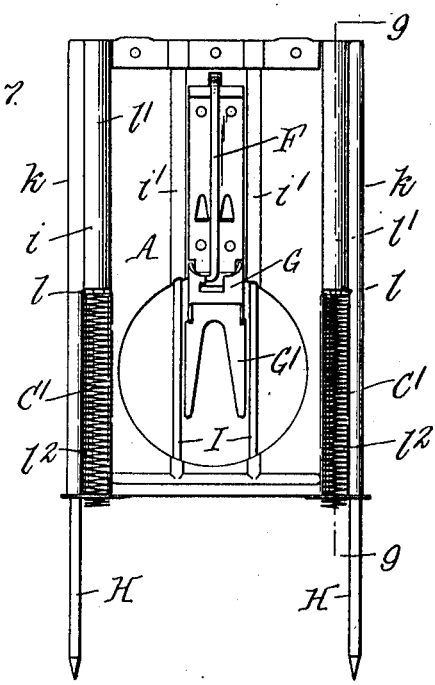
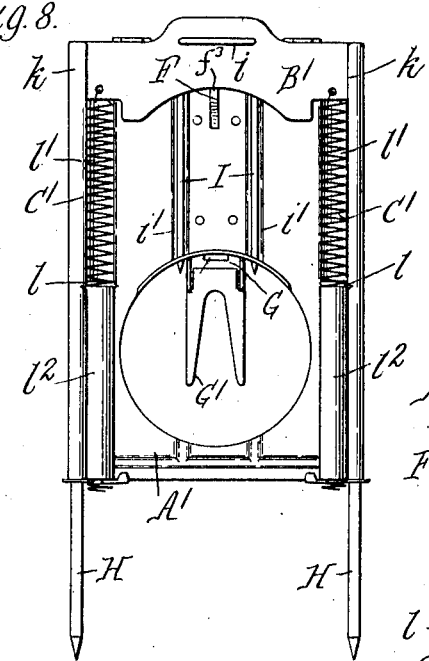
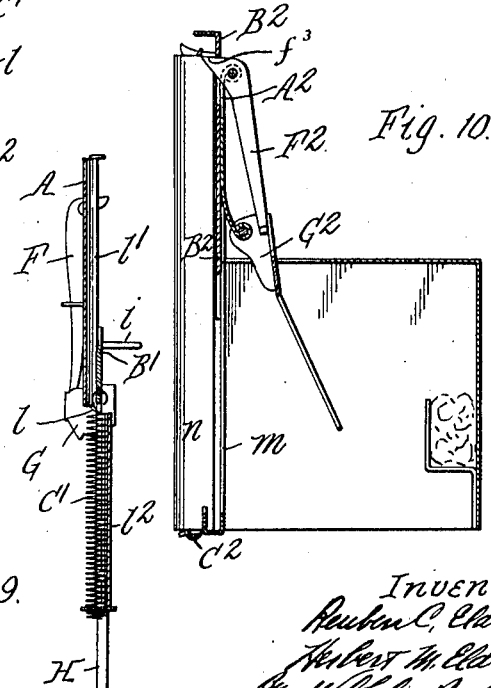

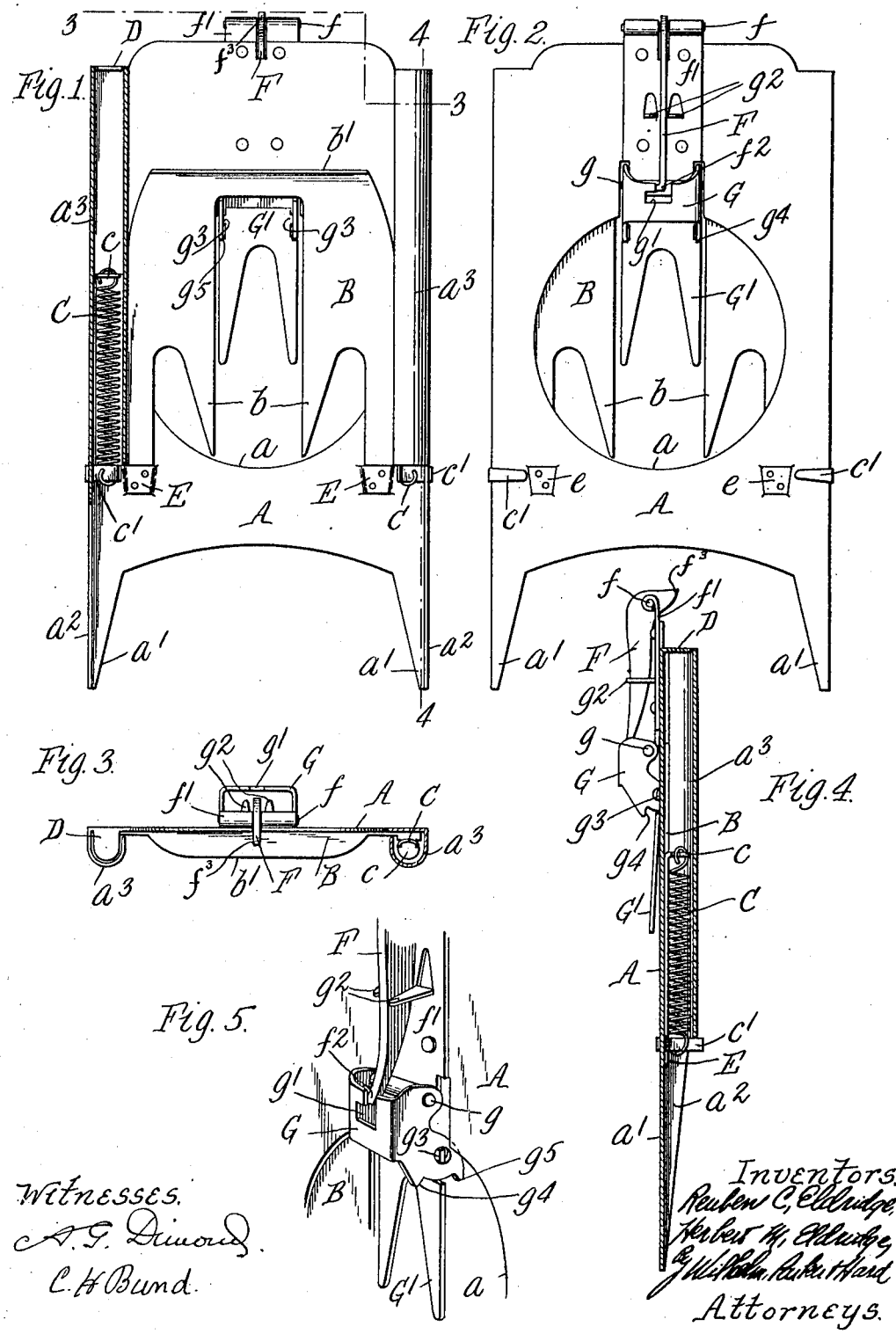

UNITED STATES PATENT OFFICE.

REUBEN C. ELDRIDGE AND HERBERT M. ELDRIDGE, OF NIAGARA FALLS, ONTARIO, CANADA; SAID HERBERT M. ELDRIDGE ASSIGNOR TO SAID REUBEN C. ELDRIDGE.

ANIMAL-TRAP.

1,026,305. Specification of Letters Patent. Patented May 14, 1912.

Application filed October 27, 1909. Serial No. 524,783.

*To all whom it may concern:*

Be it known that we, REUBEN C. ELDRIDGE, a subject of the King of Great Britain, and HERBERT M. ELDRIDGE, a citizen of the United States, both residing at Niagara Falls, in the Province of Ontario, in the Dominion of Canada, have invented a new and useful Improvement in Animal-Traps, of which the following is a specification.

This invention relates more particularly to animal traps of that type, used for catching gophers, prairie dogs, squirrels and other animals, which are placed in such relation to the animal's hole, or other runway, that the animal in attempting to pass will enter the trap and be impaled or held by a spring-actuated plunger or member which is released by a trigger arranged to be tripped by the animal. The improvements are not, however, limited in application to traps of this particular type, and some of the features of the invention, especially the trigger device, are adapted to use in traps of various different kinds which have a trigger-controlled movable plunger, door, or member for impaling, holding or confining the animal. Furthermore, the trap hereinafter described is well suited for trapping animals of any size, even wolves and bears, without requiring any material change in the construction of the trap, it being only necessary to make the traps of sufficient size and strength.

One of the objects of the invention is to produce a strong and durable trap, which will be reliable and certain in action and which can be made cheaply from sheet metal.

Other objects of the invention are to provide a trigger or catch for the movable member of a trap which enables the trap to be quickly and easily set and which will effectually prevent the accidental operation of the trap but will nevertheless be sensitive in action and require very little pressure on the trigger to spring the trap; also to provide the trigger with a part which the animal engages and which is freely movable without springing the trap for a sufficient distance to allow the animal to insert its head well into the trap before the trap is sprung; also to provide a trigger which will operate to release the movable member when moved in either direction from its normal position; and also to improve animal traps in the several respects hereinafter described and set forth in the claims.

In the accompanying drawings, consisting of two sheets: Figure 1 is a front elevation of a trap embodying the invention. Fig. 2 is a rear elevation thereof. Fig. 3 is a plan thereof, partly in section, in line 3—3, Fig. 1. Fig. 4 is a sectional elevation thereof in line 4—4, Fig. 1. Fig. 5 is a perspective view of the trigger device. Fig. 6 is a central sectional elevation thereof showing the trap set. Fig. 7 is a rear elevation of a trap of slightly modified construction. Fig. 8 is a front elevation thereof showing the trap set. Fig. 9 is a section thereof in line 9—9, Fig. 7. Fig. 10 is a sectional elevation of a box trap embodying the invention.

Like reference characters refer to like parts in the several figures.

The trap comprises a stationary body or box adapted to be placed in position for the animal to enter an opening therein, a spring-actuated plunger or member for impaling, holding or confining the animal, and a trigger which holds the plunger against movement by its spring and which, when moved by the animal entering the trap, releases the plunger or member which is then actuated by its spring.

Referring first to the construction shown in Figs. 1–6, A represents the stationary frame or body of the trap which is provided with an opening $a$, preferably circular, for the entrance of the animal, and B represents the spring-actuated movable plunger or member for impaling or holding the animal. The frame or body consists of a single flat piece or plate of sheet metal on one side of which the plunger is mounted to slide. The central portion of the lower end of the blank from which the body is made is cut out to form tapered or pointed legs $a'$ at the sides of the body which are adapted to be forced into the ground to secure the trap in place with the opening $a$ opposite the animal's hole or in any other suitable position such that the animal will enter it, and the lower portions of the side edges of the blank are bent at right angles to the plane of the body to form stiffening and strengthening flanges $a^2$ for the legs $a'$. The opposite edge portions of the blank above the legs are bent forwardly and then inwardly and rearwardly toward the face of the body so as to form vertical hollow spring tubes or guides $a^3$ at the opposite edges of the body. The opposite side edges of the plunger or movable member B extend into these guide tubes between the inturned edges thereof and the front face of the body whereby the plunger is slidably held in place on the front of the body. The plunger or movable member B shown is made from a single piece of sheet metal, the central portion of which is cut out so as to form two sharp pointed prongs $b$ for impaling the animal. A forwardly bent flange or part $b'$ at the upper end of the plunger forms a finger piece for raising the plunger. C represents actuating springs for the plunger or movable member B. These springs are located in the spring tubes or guides $a^3$ at the edges of the body, being attached at opposite ends to the plunger and to the body A, the tubes $a^3$ forming housings in which the springs are confined in place and protected. As shown, the upper ends of the springs are fastened to ears $c$ which extend forwardly from the upper end of the plunger into the spring tubes, and their lower ends are fastened by pins or strips $c'$ which extend through holes in the body and bear against the lower ends of the guide tubes. The springs could, however, be fastened to the plunger and body in any other suitable manner.

D, Figs. 3 and 4, represents lugs or portions which are bent forwardly from the upper corners of the body plate to close the upper ends of the spring tubes and form stops adapted to be engaged by the spring attaching ears $c$ on the plunger to limit the upward movement of the plunger. For limiting the downward movement of the plunger by its springs the body plate is slit at opposite sides below the lower edge of the plunger and the portions E thereof between the slits are pressed outwardly or forwardly and wedge-shaped plates $e$ are placed in the pockets formed at the rear side of the body by these stop-portions E and riveted to the portions E for reinforcing them. Strong and durable stops are thus provided which will withstand the severe impacts of the plunger. Any other suitable stops for limiting the upward and downward movements of the plunger could be employed. The movable member or plunger is held in the raised or set position against the action of its spring by a lever or detent F which is pivotally mounted on the body and is controlled by a trigger consisting of a head G and a pivoted tail or extension G'.

In the construction shown, which is considered preferable, the lever or detent is pivoted by a pin $f$ to a pivot plate $f'$ riveted on the back of the body and has an arm $f^3$ which projects forwardly over the upper end of the body and is adapted to engage the upper edge of the cut out portion of the plunger, and a depending arm with a laterally bent lug or extremity $f^2$. The head G of the trigger is pivoted by side flanges and a pin $g$ to the pivot plate $f'$ and has a slot $g'$ with a narrow throat, or of L-shape, through which the bent end of the lever F is adapted to pass when the trigger head is swung either forwardly or rearwardly from a normal intermediate position in which a lug or edge at one side of the throat of the slot engages the lateral extremity of the lever and holds the lever. Guide lugs $g^2$, Fig. 5, are stamped up from the pivot plate by which the lever is guided so that its end will register properly with the slot in the trigger head. The tail or extension G' of the trigger is pivoted between the flanges of the trigger head by pivot lugs $g^3$, Fig. 5, on the tail entering pivot holes in the flanges of the head, or in any other suitable manner. The tail is adapted to swing freely on the head independently thereof in either direction until it engages one of two opposite shoulders $g^4$ and $g^5$ on each side flange of the head, when the head will be caused to swing with the tail as a single part.

To set the trap the plunger or movable member B is raised and the lever or detent F is swung to the position shown in Fig. 6, with its forwardly-projecting arm engaging under the upper edge of the cut-out portion of the plunger and the lateral end lug $f^2$ bearing against the lug or edge of the L-slot in the trigger head. The trigger head prevents the movement of the lever under the pressure of the spring-actuated plunger thereon and the lever thus holds the plunger up. When the trap is thus set the tail of the trigger hangs substantially vertically in the opening $a$ of the body so as to be moved by an animal attempting to enter the opening from either side. The movement of the trigger head in either direction far enough to cause the lug of the L-slot of the head to clear the end lug $f^2$ of the lever will free the lever and permit the actuation of the plunger by its springs to impale the animal. The trigger constructed as described can be readily operated to set the trap and while the strong pressure of the plunger on the lever has no tendency to move the trigger to the releasing position and consequently is securely held, nevertheless very little pressure on the trigger is required to release the lever and spring the trap, and, as the tail of the trigger has considerable free movement before moving the trigger head, the animal is permitted to insert its head well into the trap before springing it, thereby insuring the proper impaling of the animal. While the trigger with the pivoted tail G' is preferable in traps of this sort, a very effective and sensitive trigger is produced by a head of similar form with a rigid tail or operating extension, as shown in Fig. 10.

The trap shown in Figs. 7 and 8 is of the same type as that above described but differs therefrom in details of construction, principally in the following respects: The legs H of the trap are formed by rods or wires secured to the plate A' of which the body is made by bending the side edges of the body plate around the leg wires. The impaling prongs I of the plunger B' are formed by a wire which is bent into U-form and passed through holes in the plunger plate, the bent or looped end $i$ of the wire, which projects out from the plunger, providing a handle for raising the plunger. The body plate is formed with corrugations or grooves $i'$ in which the impaling prongs slide and are guided. The guides $k$ for the plunger are formed by the bent edges of the body plate, but instead of the inclosing tubes for the springs C', such as shown in Figs. 1–4, slits are made in the body plate at $l$ and the portions $l'$ of the plate adjacent to the plunger guides above the slits are bent rearwardly, while the corresponding portions $l^2$ of the plate below the slits are bent forwardly, see Fig. 9, thus forming grooves in which the springs are confined and guided in the operation of the trap. The trigger device is constructed as above described.

The trap body made of metal plate as above described has the advantage over a skeleton frame made of wire or rods, in that it more perfectly fills or closes the hole of the animal. Burrowing animals mostly have a funnel-shaped entrance to their holes. With a trap having a wire or skeleton frame, which is usually tall, it is necessary to cut down a place in the earth for the upper part of the trap and to bank up on the sides of the trap. The trap with the plate body can be placed in position with much less trouble and will effectually fill or close such a funnel-shape opening. The two springs placed as described at the sides of the trap widen it and enable it to be made much shorter than if a single central spring were employed.

Fig. 10 shows the invention applied to a box or cage trap. In this trap the body comprises a front wall $A^2$ which is substantially similar in construction to the body plate of the trap first described, and a box or cage which is secured in any suitable manner to this front wall. The front wall has an opening $m$ through which the animal can enter the cage. The movable member or plunger $B^2$ is slidably mounted on the front wall in the same manner as the impaling plunger in the first trap described, but, instead of the impaling plunger, the member constitutes a slide or door for closing the opening and holding or confining the animal. The slide is operated by springs $C^2$ arranged in spring tubes or guides $n$ at the sides of the front wall. The slide is held, when raised or set, by a lever $F^2$ which is controlled by a trigger $G^2$ which is similar to that before described except that it has a rigid tail or extension. This trigger normally extends back into the cage at a sufficient inclination to allow the animal to enter well into the trap before releasing the slide. This trigger can be arranged so that it can set far enough back to permit the animal to go in and out of the trap without springing it. In this way the trap can be made familiar to rats and other animals so that they will be made fearless of it by feeding them in the traps. Bait can be placed in a suitable holder at the back of the trap, as shown in Fig. 10. This construction is suitable for smaller traps, such as used for mice and rats.

It will be apparent from the above that the improvements are applicable to traps of various different constructions in which a movable member, slide or plunger is employed for securing the animal, and the trigger device is capable of use for controlling such a movable member or plunger irrespective of the type or construction of the trap in which it is employed.

We claim as our invention:

1. In a trap having a frame provided with an opening for the entrance of the animal, and a movable member for entrapping the animal, the combination of a lever pivoted between its ends to swing in a plane transversely to the plane of said opening, one of the ends of said lever extending at an angle to the plane of said opening and being adapted to engage said movable member to hold the same from action and the other end having a lateral projection, and a trigger pivoted to swing in the plane of movement of said lever and adapted to be actuated by the animal entering said opening from either direction, said trigger having a slot through which said projection of said lever is adapted to move, and a lug which engages said projection of the lever to hold the lever, substantially as set forth.

2. In a trap having a movable member for entrapping the animal, the combination of a lever for holding the movable member from action, and a trigger comprising a movable head which engages and holds the lever, and an extension which has a limited movement independently of the trigger head, substantially as set forth.

3. In a trap having a movable member for entrapping the animal, the combination of a lever for holding the movable member from action, and a trigger comprising a movable head which engages and holds the lever and an extension which is pivoted to said head and is movable freely between shoulders on the head whereby the extension has a limited movement independently of said head and causes the movement of the head by a continued movement of said extension, substantially as set forth.

4. In a trap having a movable member for entrapping the animal, the combination of a lever for holding the movable member from action, and a trigger comprising a movable head which engages and holds the lever, and an operating extension which has a limited movement in opposite directions independently of the trigger head and which is adapted to be moved by an animal entering the trap from either direction to release said lever, substantially as set forth.

5. In a trap having a sliding member for entrapping the animal, and means for holding the sliding member at its set position which are actuated by the animal to release the sliding member, the combination of a body plate having integral portions thereof bent to form guides for the sliding member and tubular spring housings, and springs for actuating said sliding member located in said spring housings, said body plate having portions thereof bent to close the ends of said spring housings and form stops for the sliding member, substantially as set forth.

6. A trap comprising two flat metal plates placed with a face of one plate against a face of the other plate, one of said plates constituting the body portion of the trap and being provided with an opening for the entrance of the animal, and said other plate forming a plunger which is arranged to slide relatively to the body plate on one face thereof and is provided with prongs for impaling the animal, one of said plates having integral portions embracing the other plate to guide said movable plate and forming tubular spring housings, springs for actuating said plunger plate which are located in said spring housings, and a trigger for releasably holding said plunger plate, substantially as set forth.

7. A trap comprising two flat metal plates placed with a face of one plate against a face of the other plate, one of said plates constituting the body portion of the trap and being provided with an opening for the entrance of the animal which is entirely surrounded by the metal of the plate and having legs extending downwardly and adapted to be forced into the ground, and said other plate forming a plunger which is arranged to slide relatively to the body plate on one face thereof and is provided with prongs for impaling the animal, one of said plates having integral portions embracing the other plate to guide said movable plate, and a trigger for releasably holding said plunger plate, substantially as set forth.

8. A trap comprising two flat metal plates placed with a face of one plate against a face of the other plate, one of said plates constituting the body portion of the trap and being provided with an opening for the entrance of the animal and said other plate forming a plunger which is arranged to slide relatively to the body plate on one face thereof and is provided with prongs for impaling the animal, actuating springs for said plunger plate, one of said plates having integral portions which are bent to embrace the edges of said plunger and form housings for said springs, and the edges of which portions form guides for the movement of said plunger plate, and means for releasably holding said plunger plate, substantially as set forth.

Witness our hands, this 19th day of October, 1909.

REUBEN C. ELDRIDGE.
HERBERT M. ELDRIDGE.

Witnesses:
M. M. BULLOCK,
H. B. LEACH.

Copies of this patent may be obtained for five cents each, by addressing the "Commissioner of Patents Washington, D. C."